No. 719,927. PATENTED FEB. 3, 1903.
C. H. WILKINSON.
TIRE.
APPLICATION FILED JUNE 16, 1902.
NO MODEL.

Witnesses
Walter Allen
R. H. Young

Inventor
Charles H. Wilkinson
by Herbert W. J. Jenner.
Attorney.

UNITED STATES PATENT OFFICE.

CHARLES HENRY WILKINSON, OF HUDDERSFIELD, ENGLAND.

TIRE.

SPECIFICATION forming part of Letters Patent No. 719,927, dated February 3, 1903.

Application filed June 16, 1902. Serial No. 111,846. (No model.)

*To all whom it may concern:*

Be it known that I, CHARLES HENRY WILKINSON, residing at Huddersfield, in the county of York, England, have invented certain new and useful Improvements in Tires; and I do hereby declare the following to be a full, clear, and exact description of the invention, such as will enable others skilled in the art to which it appertains to make and use the same.

According to my invention I interpose between the tire and the rim of the wheel a number of wires or spokes crossing each other in the form of a letter X, which are capable of opening out and inclining forward when subjected to pressure and which on such pressure being removed are restored to their former positions by springs or india-rubber, as hereinafter described. By this means I obtain at least as much resiliency as is obtained by the use of pneumatic tires without the necessity of inflation and liability to puncture.

In order that my invention may be clearly understood, I will now describe the same with reference to the examples shown in the accompanying sheet of drawings, wherein—

Figure 1:
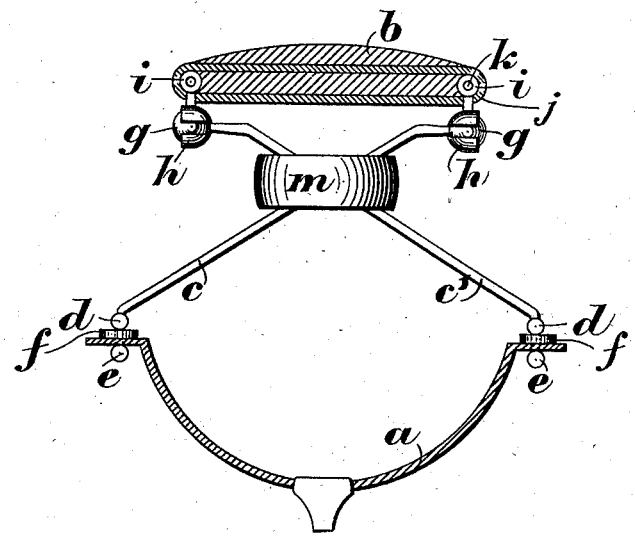
Figure 2:
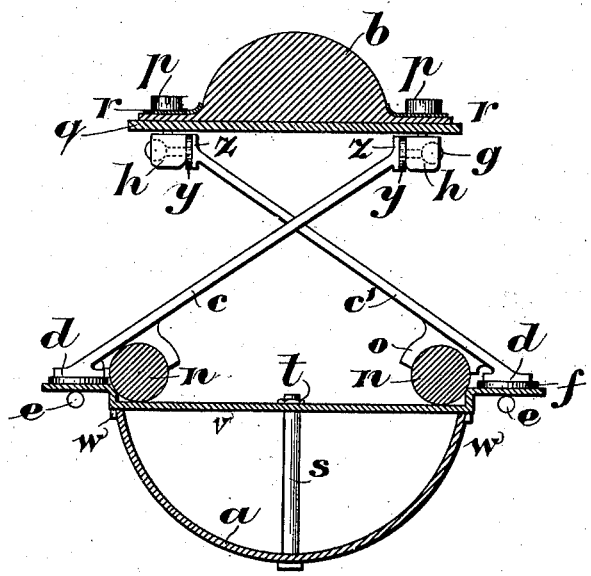

Figure 1 shows in section a construction adapted for light vehicles, such as bicycles. Fig. 2 shows a construction adapted for heavy vehicles, such as motor cars and carriages.

Referring to Fig. 1, $a$ represents the rim of the wheel, to which the ordinary spokes are attached. $b$ represents the wearing-tread, which may be of hard rubber or otherwise, as desired. $c$ and $c'$ represent the crossed wires or spokes, which are cranked at each end. At the lower end of each wire are two cylindrical cross-pieces or rollers $d$ $e$, with a neck between them. A rubber washer $f$ is placed on the neck, and the lower roller $e$ is passed through a suitable slot in the rim $a$, when the wire $c$ is turned a quarter round, so as to cause said roller $e$ to engage the wheel-rim and retain the said wire $c$ in position. The upper ends of the wires $c$ $c'$ are preferably reduced in thickness at the cranked part and terminate in balls $g$. The crank or neck of the wire is adapted to pass through a slot in the side of cup $h$ in order to allow of the ball $g$ being drawn into such cup $h$ to secure the crossed wires to the outer tire. The cup $h$ carries an eyelet $i$, such eyelet $i$ entering the hollow band or flattened tube $j$. Through all the eyelets are threaded wires $k$, passing all around the wheel, the spaces on the said wires $k$ between the eyelets being filled up with spiral wires or other suitable material cut in lengths, as required. It will be seen that the eyelets $i$ and sockets $h$ allow a little freedom of movement to the spokes $c$ $c'$, and the rubber washers $f$ on being compressed allow the said spokes to move in their slots in the rim $a$ to a small extent, and at the crossing of the spokes $c$ $c'$ I employ any suitable spring device, such as a rubber ring $m$, for holding said spokes together at the point of crossing, such rubber ring allowing the spokes to yield to pressure and by its elasticity restoring them to their former positions on the pressure being removed. By this construction I obtain resiliency at several points between the tread $b$ and the rim $a$.

Referring now to Fig. 2, this shows another method of carrying into practical effect the same principle, but with a somewhat stronger and heavier construction, in which the ring $m$ is dispensed with and instead thereof the cross-spokes act as levers, bearing on the rubber or other tubes or cords $n$ as fulcrums. Shoes $o$ are provided on the levers $c$ $c'$ for clasping the tubes or cords $n$. A single tube or cord $n$, fixed centrally of the felly $v$, may be employed instead of two, and the diameter of the cords and position of the shoes may be varied according to circumstances. The positions and functions of the parts $d$, $e$, and $f$ are similar to those as per Fig. 1; but I prefer to make $d$ a horizontal disk and $e$ a vertical disk, this, however, being merely a constructive detail. The sockets $h$ of the ball-joints $g$ are preferably attached by screws and nuts $p$, the screws passing through the flexible steel plate or rim $q$, rubber tread $b$, and metal band $r$. The slot for the insertion of the ball and neck is preferably on the under side of the cup $h$, and a rubber washer $y$ is added, as shown. The metal bands $r$ (which of course pass all around the wheel) have a lip or turned-up inner edge, as shown, for supporting the rubber tread $b$ at the angle thereof, which is the point subject to the greatest strain in actual wear. The ordinary rim $a$ of the wheel may be attached in the usual manner by bolts s and washers t to the steel base-rim or felly v; but I preferably make such felly or base-rim v channeled, as shown in Fig. 2, so that when it is desired to take my improved tire off the wheel for repairs or for other purposes the heels e of the levers or spokes will not get in the way when the parts are moved sidewise to slip the tire off. The rubber cords n will also rest snugly between the shoes o and the reëntrant angles formed by the channeled fellies v. To prevent any unsteady movement at places, say, half-way between any two of the bolts s, screwed studs w are provided at intervals around the wheel, which studs w hold the rim a and felly v firmly in their correct positions in relation to one another, and of course the studs w can readily be unscrewed when it is desired to take off the tire.

The treads b may, if desired, be channeled centrally to receive any suitable outer tread or wearing surface.

I claim as my invention—

1. The combination, with a wheel-rim, and its tread; of crossed spokes arranged crosswise between the said rim and tread and operatively connected to them, and springs normally holding the said spokes in position, substantially as set forth.

2. The combination, with a wheel-rim and its tread; of crossed spokes arranged crosswise between the said rim and tread and operatively connected to them, washer-plates of elastic material interposed between the said spokes and rim, and springs normally holding the said spokes in position, substantially as set forth.

3. The combination, with a wheel-rim, and its tread; of crossed spokes arranged crosswise between the said rim and tread and operatively connected with the said rim, ball-and-socket joints connecting the said spokes with the said tread, and springs normally holding the said spokes in position, substantially as set forth.

4. The combination, with a wheel-rim, its tread, and a tubular band supporting the said tread; of ball-sockets provided with slots and pivoted to the side portions of the said band, crossed spokes arranged crosswise between the said rim and tread and operatively connected with the said rim and provided with balls which engage with the said sockets, and springs normally holding the said spokes in position, substantially as set forth.

5. In tires for cycles, motor-cars, and other vehicles, the combination with crossed spokes or wires c, c', connected with the tread by ball-joints at their outer ends, and resiliently connected with the wheel-rim, of a rubber ring m or equivalent device for restoring such spokes or wires to their original position on the removal of pressure.

In testimony whereof I affix my signature in presence of two witnesses.

CHARLES HENRY WILKINSON.

Witnesses:
ERNEST P. NEWTON,
LEONARD H. CROSSLEY.